US011772751B2

(12) United States Patent
Fichou

(10) Patent No.: US 11,772,751 B2
(45) Date of Patent: Oct. 3, 2023

(54) SYSTEM FOR RECOVERING A SURFACE MARINE CRAFT FROM A CARRIER SHIP

(71) Applicant: ECA ROBOTICS, La Garde (FR)

(72) Inventor: Maël Fichou, Sainte Anastasie sur Issole (FR)

(73) Assignee: ECA ROBOTICS, La Garde (FR)

( * ) Notice: Subject to any disclaimer, the term of this patent is extended or adjusted under 35 U.S.C. 154(b) by 4 days.

(21) Appl. No.: 17/604,303

(22) PCT Filed: Apr. 9, 2020

(86) PCT No.: PCT/EP2020/060257
§ 371 (c)(1),
(2) Date: Oct. 15, 2021

(87) PCT Pub. No.: WO2020/212269
PCT Pub. Date: Oct. 22, 2020

(65) Prior Publication Data

US 2022/0212760 A1 Jul. 7, 2022

(30) Foreign Application Priority Data

Apr. 17, 2019 (FR) ...................................... 1904125

(51) Int. Cl.
*B63B 27/36* (2006.01)
*B63B 21/58* (2006.01)
(Continued)

(52) U.S. Cl.
CPC .............. *B63B 27/36* (2013.01); *B63B 21/58* (2013.01); *B63B 23/60* (2013.01); *B63B 2027/165* (2013.01); *B66C 13/02* (2013.01)

(58) Field of Classification Search
CPC ..... B63B 27/143; B63B 27/146; B63B 27/16; B63B 2027/165; B63B 27/36;
(Continued)

(56) References Cited

U.S. PATENT DOCUMENTS 4,697,533 A * 10/1987 Bordreuil ................ B63B 35/40
114/344
5,378,851 A * 1/1995 Brooke ................... B63B 21/66
114/259
(Continued)

FOREIGN PATENT DOCUMENTS

CN 103183113 7/2013
CN 104015886 9/2014
(Continued)

OTHER PUBLICATIONS

International Search Report for PCT/EP2020/060257 dated May 8, 2020, 7 pages.
(Continued)

*Primary Examiner* — Daniel V Venne
(74) *Attorney, Agent, or Firm* — NIXON & VANDERHYE

(57) ABSTRACT

A system for the recovery of a surface marine craft by a carrier ship includes a lifting device with which the carrier ship is intended to be equipped and which includes a lifting unit of the davit type, equipped with a lifting cable including, at one end, a connection interface, a pole bearing a guide cable, an anchor connected to one end of the guide cable, the connection interface for the lifting cable being coupled removably to the anchor, and a hauling cable. The system also includes a receiving device with which the marine craft is intended to be equipped, the receiving device including a forward module.

20 Claims, 8 Drawing Sheets

(51) Int. Cl.
*B63B 23/60* (2006.01)
*B63B 27/16* (2006.01)
*B66C 13/02* (2006.01)

(58) Field of Classification Search
CPC ......... B63B 21/58; B63B 23/60; B63B 19/08; B63B 23/48; B66C 13/02; B66D 1/52
USPC ................................................... 114/258, 259
See application file for complete search history.

(56) References Cited

U.S. PATENT DOCUMENTS

| | | | | |
|---|---|---|---|---|
| 6,152,065 | A * | 11/2000 | Gronstrand | B63B 23/30 405/1 |
| 6,178,914 | B1 * | 1/2001 | Axelsson | B63B 27/36 114/248 |
| 7,156,036 | B2 * | 1/2007 | Seiple | B63B 27/143 114/259 |
| 7,506,606 | B2 * | 3/2009 | Murphy | B63B 27/10 114/248 |
| 7,581,507 | B2 * | 9/2009 | Kern | B65G 17/064 114/259 |
| 8,578,872 | B1 * | 11/2013 | Spellacy | B63B 27/36 114/259 |
| 9,061,740 | B2 * | 6/2015 | Henriksen | B63B 27/36 |
| 11,192,614 | B2 * | 12/2021 | Peleg | B63C 7/16 |
| 2018/0312225 | A1 | 11/2018 | Peleg et al. | |

FOREIGN PATENT DOCUMENTS

| | | |
|---|---|---|
| GB | 2532602 | 5/2016 |
| WO | 89/09723 | 10/1989 |
| WO | 01/74655 | 10/2001 |
| WO | 2011/151653 | 12/2011 |
| WO | 2018/231273 | 12/2018 |
| WO | 2019/052801 | 3/2019 |

OTHER PUBLICATIONS

Written Opinion of the ISA for PCT/EP2020/060257 dated May 8, 2020, 6 pages.

* cited by examiner

Fig.1
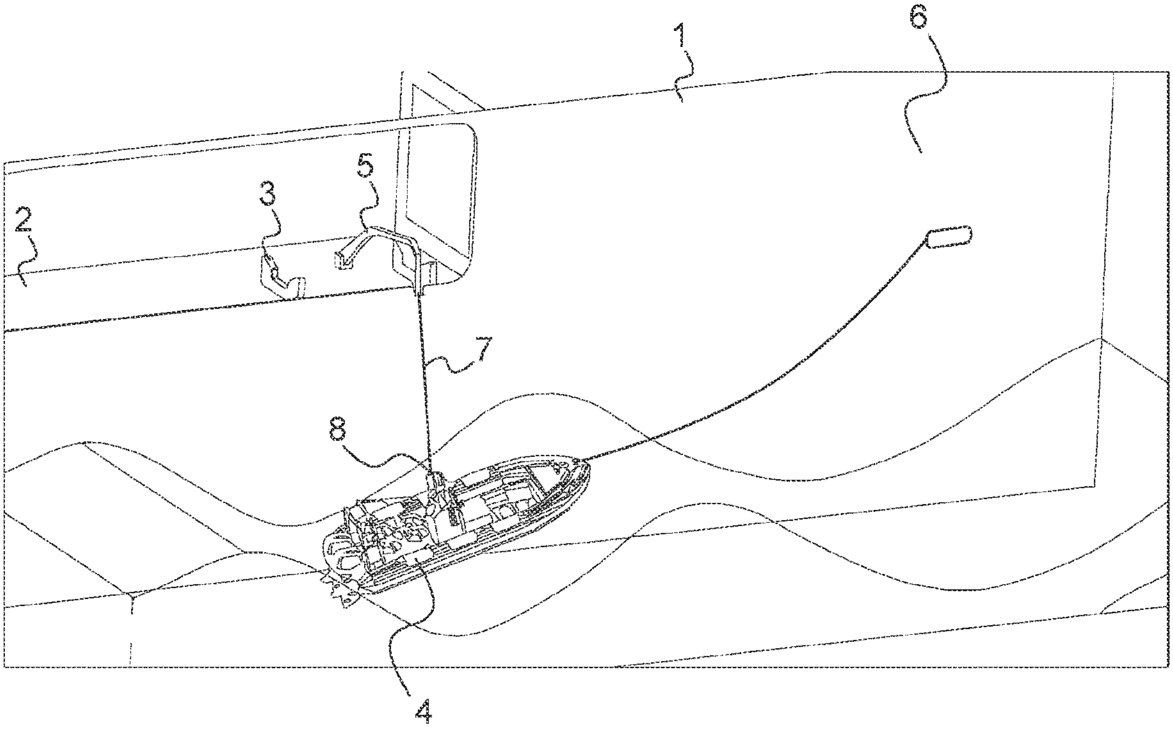
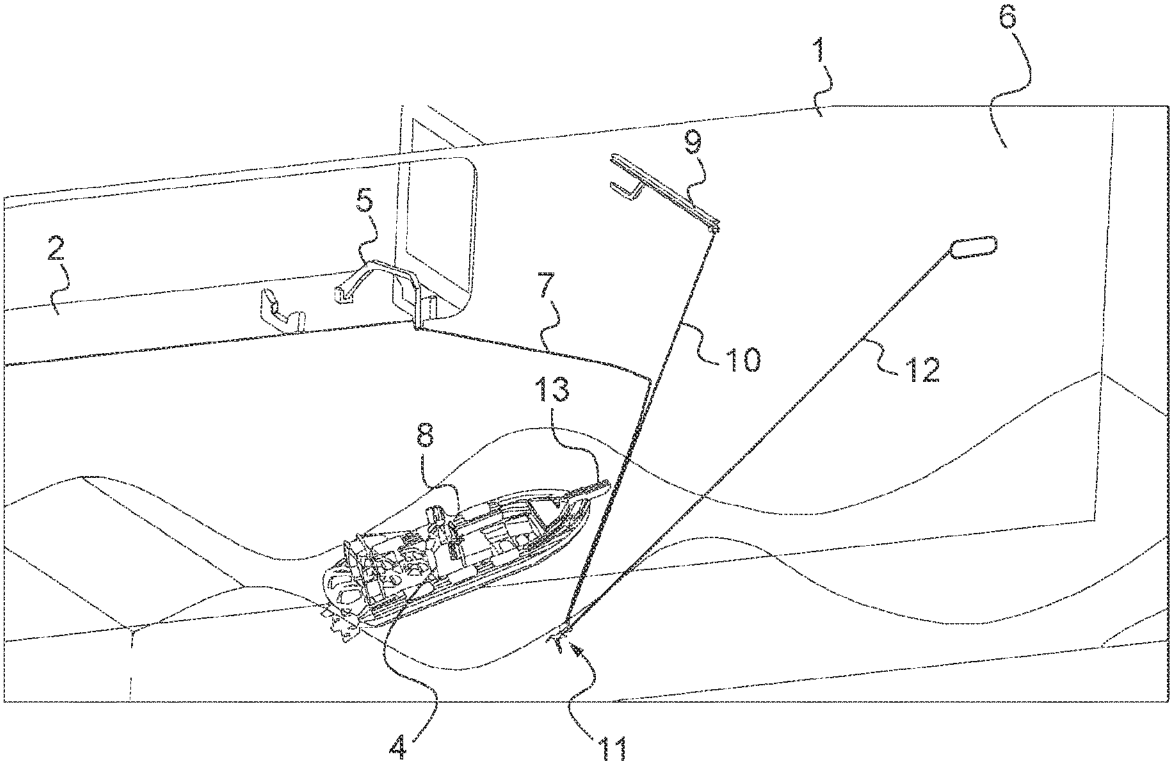
Fig.2

Fig.3
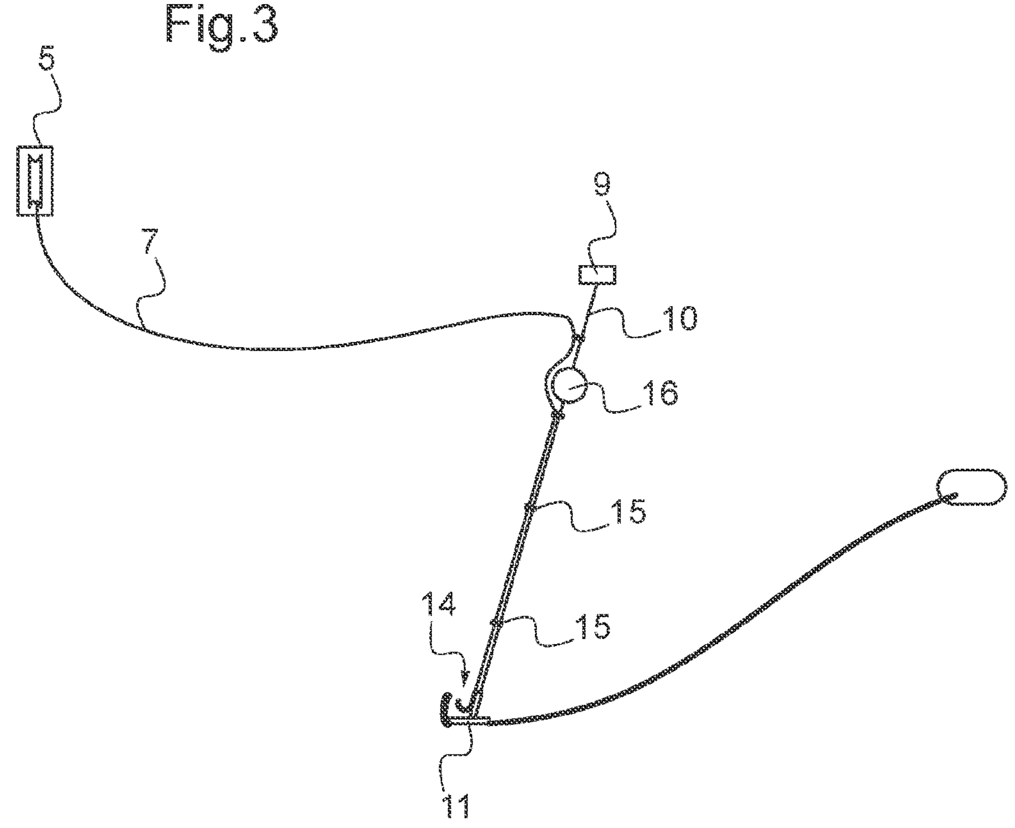
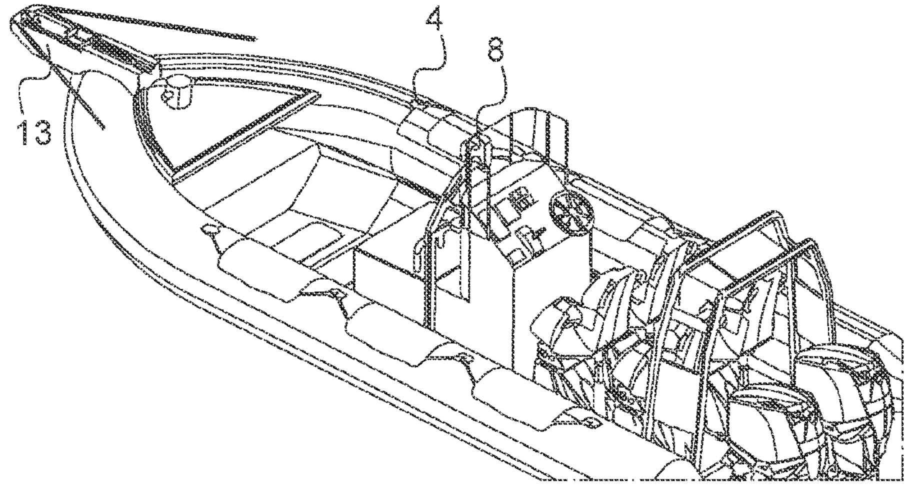
Fig.4

Fig.5
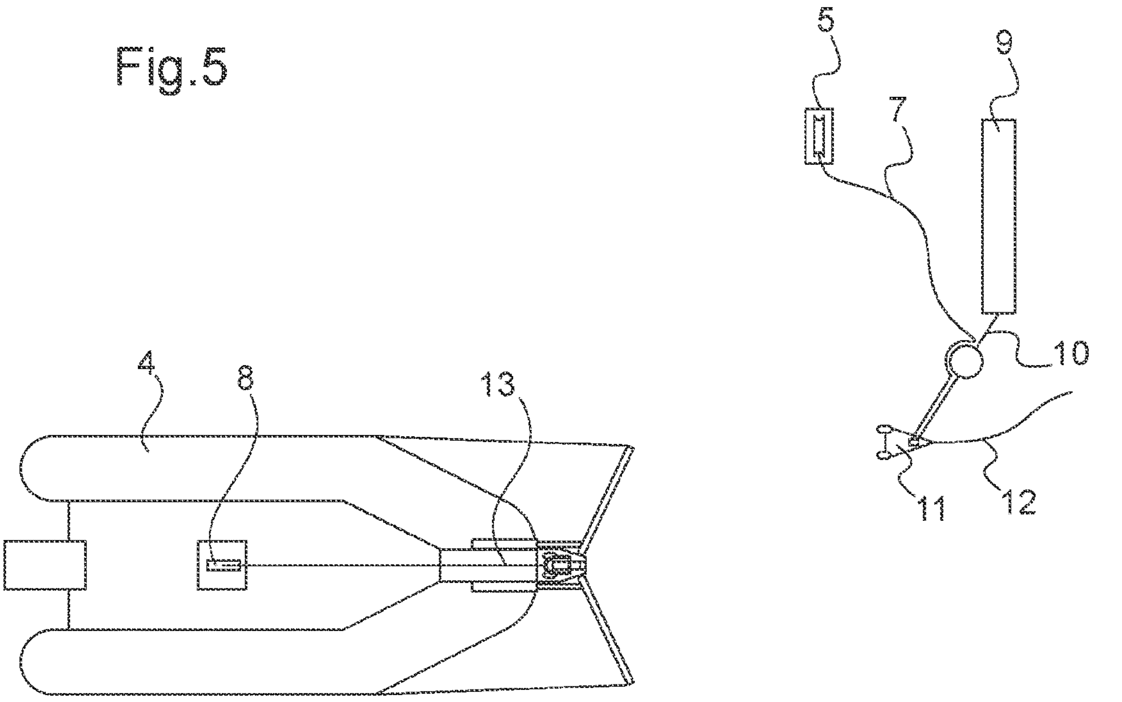
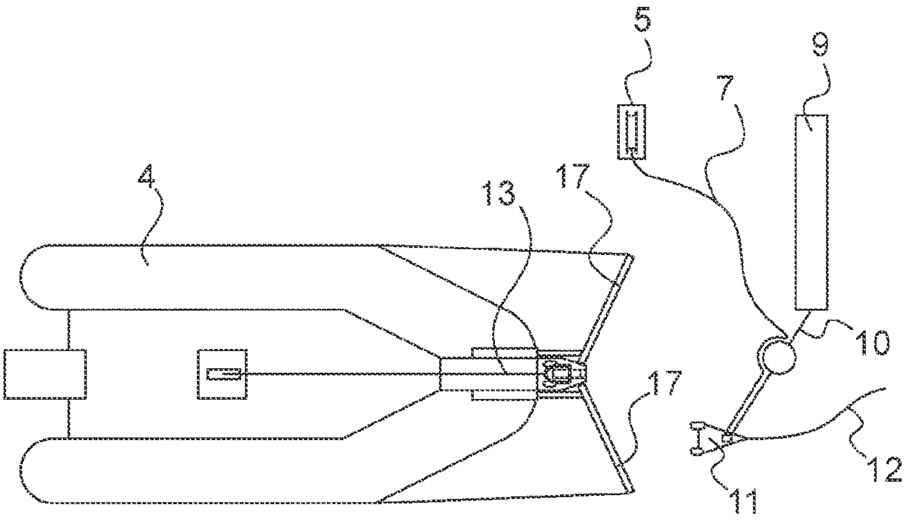
Fig.6

Fig.12
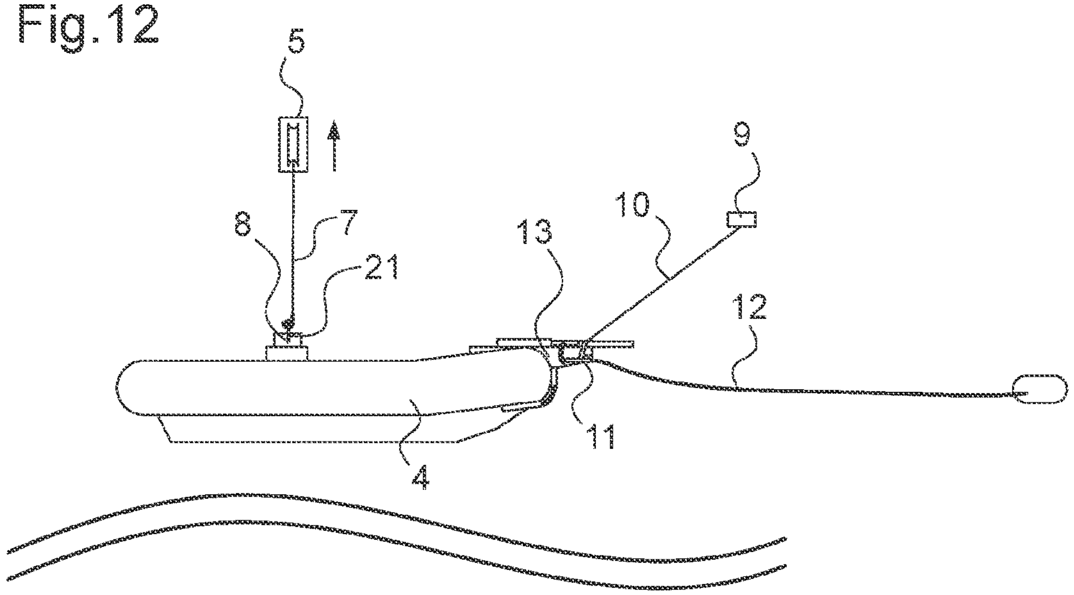
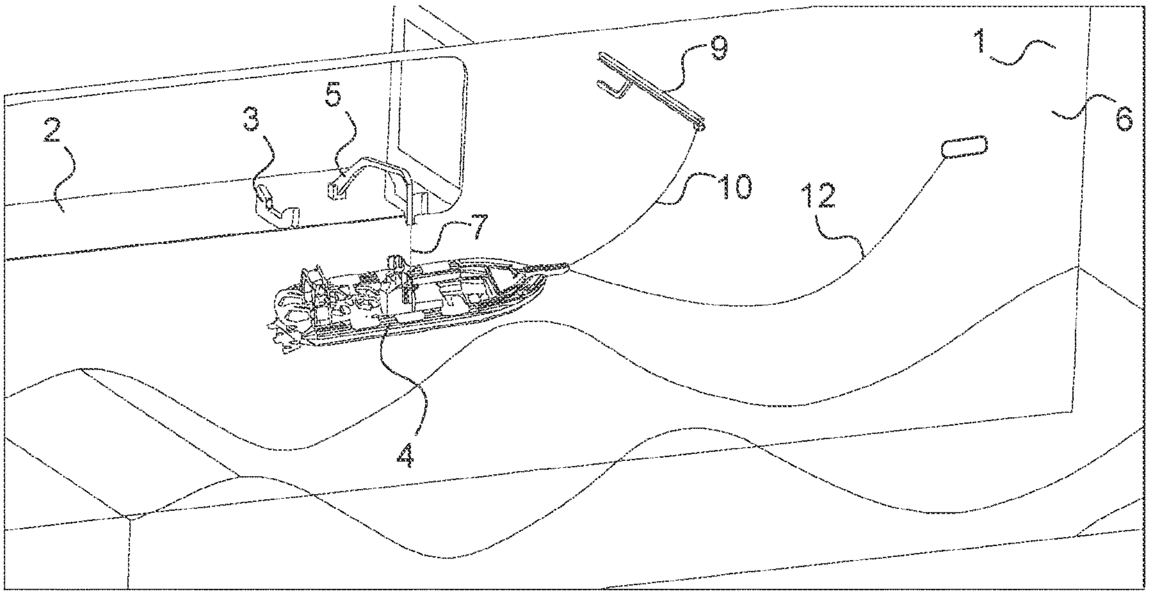
Fig.13

SYSTEM FOR RECOVERING A SURFACE MARINE CRAFT FROM A CARRIER SHIP

This application is the U.S. national phase of International Application No. PCT/EP2020/060257 filed Apr. 9, 2020 which designated the U.S. and claims priority to FR Patent Application No. 1904125 filed Apr. 17, 2019, the entire contents of each of which are hereby incorporated by reference.

BACKGROUND OF THE INVENTION

Field of the Invention

The present invention relates to the field of launching and recovery of unsinkable marine craft by a vessel.

It relates more particularly to the recovery of vessels of small dimensions from a mother vessel or carrier ship. This includes coasters, tenders, exploration vessels, whether piloted, remotely operated or autonomous (surface drone). In a military ship, the set of these small craft on board the carrier ship is called the davit craft.

A preferential application of the invention is found in the launching and recovery of semi-rigid boats, commonly known as RHIBs for “rigid-hulled inflatable boat”.

Description of the Related Art

The launching of a marine craft by a ship, called mother vessel, carrier ship, or else mothership, as well as its recovery, are carried out in the state of the art by virtue of various devices.

It is known for example to use davits, of various types, which make it possible to deposit a marine craft in the water or lift it from the surface of the water, overhanging the hull of the mother vessel. Davits are particularly suitable for the launching and recovery of surface craft.

Document CN 104,015,886 presents an example of a device with davits.

Davits are reliable devices in widespread use. However, the devices with davits known in the state of the art have a certain number of drawbacks.

Systems with davits are not generally suitable for recoveries of autonomous surface marine craft. The devices with davits that allow recoveries of autonomous marine craft or without intervention by the personnel on board the marine craft are dedicated devices for a specific type of craft and are complex and heavy. These devices are difficult to adapt to ships that are not originally equipped with them.

Moreover, the use of simply constituted systems with davits is complex or even impossible in a moderate sea with significant swell. Sea state is commonly described according to the Douglas scale, which defines sea state in nine value classes. Davits known in the state of the art can at best be used up to sea state 3, i.e. slight.

SUMMARY OF THE INVENTION

The invention aims to propose a system of the davit type for the launching and especially the recovery of a surface marine craft, allowing the recovery of craft that are autonomous, remotely-operated, or crewed but with little (or no) involvement of the personnel on board the craft during its recovery, and capable of being utilized in a moderate sea.

Thus, the invention relates to a system for the recovery of a surface marine craft by a carrier ship, said system comprising:

a) a lifting device intended to equip the carrier ship and which comprises:

- a lifting means of the davit type, equipped with a lifting cable comprising at one end a connection interface,
- a boat hook pole intended to extend laterally outside a hull of the carrier ship, above its waterline, a guide cable being suspended from said boat hook pole,
- an anchor connected to a free end of said guide cable, said guide cable being dimensioned so that, when the anchor is suspended from the boat hook pole by the guide cable, in the absence of other constraints, the anchor is below the waterline of the carrier ship, the connection interface of the lifting cable being detachably connected to the anchor, and
- a towing cable, intended to be connected on the one hand to the carrier ship forward of the boat hook pole, and connected on the other hand to the anchor, and b) a receiving device suitable for cooperating with the lifting device and intended to equip the marine craft, the receiving device comprising:

- a forward module, intended to equip the prow of the marine craft, comprising an opening configured to receive jointly the guide cable and the lifting cable, and to allow said guide cable and lifting cable freedom in translation in said opening, and comprising a receiving housing suitable for receiving a part of the anchor by which the anchor fastens to said forward module when said part is engaged in said housing, fastening of the anchor to the forward module leading to fastening of the connection interface of the lifting cable to a handle detachably connected to the forward module, and
- a lifting support, intended to be fastened rigidly at at least one lifting point of the marine craft, said lifting support being shaped to receive and immobilize the handle. Submersion of the anchor makes it possible to hold the end of the guide cable in the water, which allows the marine craft to connect to the guide cable via its forward module, even with a significant swell.

The invention is based on a conventional device with a davit (or a device with a similar configuration) which limits its cost, facilitates its implementation, and allows the adaptation of pre-existing systems of the davit type. The utilization of a forward module borne by the surface marine craft to be recovered makes it possible to automate the steps intended to receive the guide and lifting cables at said surface marine craft.

The lifting cable can comprise an end portion fastened detachably to the guide cable so as to facilitate jointly receiving said guide cable and lifting cable in the opening of the forward module.

The system can comprise a winch on which the towing cable is wound so as to vary the length of the towing cable outside the hull of the carrier ship.

The anchor can comprise an arm by way of part by which it is fastened to the forward module, said arm being substantially oriented towards the surface of the water when the anchor is suspended by the guide cable, in the absence of other constraints, and submerged.

In an embodiment, the receiving device also comprises two guide bars articulated on the forward module, said bars being able to pivot from a folded position to a deployed position in which they form a guide, converging towards said forward module.

The handle and the lifting support preferably have corresponding shapes, such that the handle is immobilized with respect to the lifting support when the lifting cable, which was fastened to the handle via its connection interface, is tensioned.

A tension roller can be provided close to the lifting support, the tension roller comprising a handling cable connected to the handle, take-up of the handling cable making it possible to bring the handle from the forward module to the lifting support.

The invention also relates to an ensemble comprising a carrier ship and a surface marine craft comprising a recovery system such as previously described, the lifting device equipping the carrier ship and the receiving device equipping the marine craft. The marine craft can be a small craft of the semi-rigid hull type.

Finally, the invention relates to a method for the recovery of a marine craft equipped with a receiving device, by a carrier ship equipped with a lifting device, said receiving device and lifting device forming a recovery system as described above, said method comprising the steps of:

- launching the anchor connected to the guide cable and to the traction cable, the connection interface of the lifting cable being connected to said anchor;
- receiving the guide cable and the lifting cable, in the opening of the receiving device;
- bringing the anchor against the forward module and engaging in the housing of the forward module the part of the anchor intended to be received therein, leading to the fastening of the anchor to the forward module and the fastening of the connecting interface of the lifting cable to the handle;
- separating the handle with respect to the anchor, the marine craft remaining guided by the guide cable and towed by the towing cable,
- fastening the handle to the lifting support,
- lifting the marine craft by the lifting cable,
- depositing the marine craft on a deck of the carrier ship using the lifting means of the davit type.

Other features and advantages of the invention will become apparent from the following description.

BRIEF DESCRIPTION OF THE DRAWINGS

In the attached drawings, given by way of non-limitative examples:

FIG. 1 shows, in a diagrammatic three-dimensional view, the context of application of the invention;

FIG. 2 shows, in a diagrammatic three-dimensional view, a carrier ship and a surface marine craft equipped with a recovery system according to an embodiment of the invention;

FIG. 3 shows, in a diagrammatic view, a lifting device utilized in an embodiment of the invention;

FIG. 4 shows, in a three-dimensional view, a surface marine craft of the semi-rigid hull small craft type, equipped with a receiving device utilized in an embodiment of the invention;

FIG. 5 shows, in a diagrammatic top view, a surface marine craft equipped with a receiving device that can be utilized in an embodiment of the invention before recovery by the lifting device in FIG. 3;

FIG. 6 shows, in a view similar to that in FIG. 5, the surface marine craft in FIG. 5 approaching the lifting device in FIGS. 3 and 5;

FIG. 12 shows a recovery step following the step in FIG. 11;

FIG. 13 shows, in a three-dimensional view similar to that in FIG. 2, the recovery step in FIG. 12;

DESCRIPTION OF THE PREFERRED EMBODIMENTS

Figure 7:
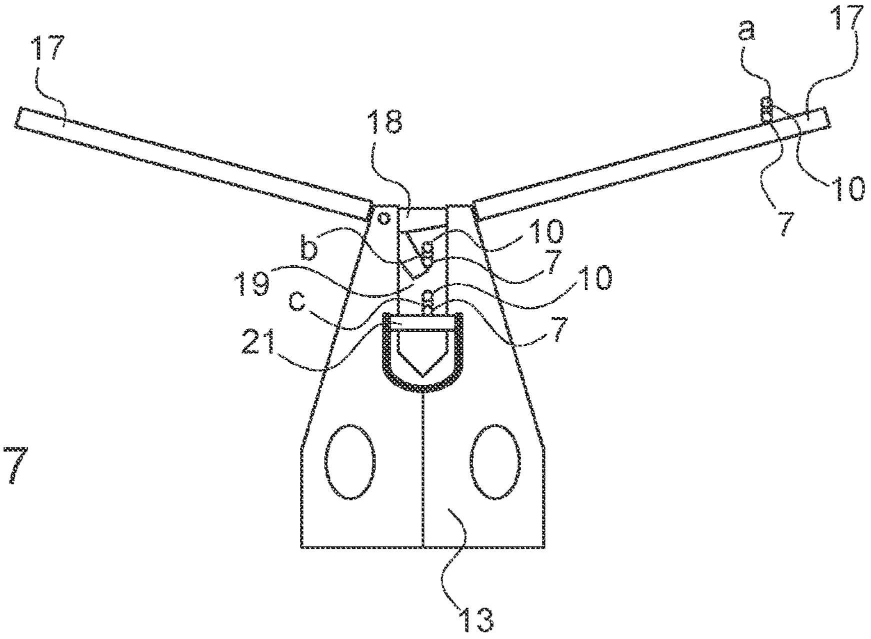
FIG. 7 shows, in a diagrammatic top view, a forward module utilized in the receiving device equipping the marine craft shown in FIGS. 5 and 6.

FIG. 1 shows the context of application of the invention, and corresponds to the state of the art. More particularly, FIG. 1 shows a part of a carrier ship 1, which comprises a deck 2, for example an after deck. The after deck 2 is intended to receive, for example on cradles 3, a marine craft 4, which is a surface marine craft.

The marine craft 4 shown here is a boat with a semi-rigid hull, capable of forming part of the davit craft of the carrier ship 1.

In order to launch the marine craft 4 and recover it, the carrier ship comprises a davit 5, the end of which can be positioned overhanging the hull 6 of the carrier ship. This makes it possible to lift or lower the marine craft 4 along the hull 6, by virtue of a lifting cable 7 connected to the davit 5. The lifting cable can in particular be unwound outside the carrier ship 1 to lower the marine craft 4 or wound in the carrier ship 1 so as to lift the marine craft 4, for example using a pulley hoist.

The lifting cable 7 is connected for this purpose to a lifting point of the marine craft, which is formed by an element suitable for bearing the weight of the marine craft and its occupants, if applicable, and which is positioned at a lifting point 8 making it possible to suspend the marine craft on an even keel, substantially flat. The lifting point is thus substantially in the vertical axis of the centre of mass of the marine craft. During lifting of the marine craft, one or more boat ropes make it possible to control the orientation of the marine craft suspended from the davit.

Of course, the lifting point can be formed based on a set of straps or ropes connected at several points of the marine craft, and the invention that is described hereinafter is applicable to such a configuration. For the sake of simplicity, it is assumed that the lifting point is a single point, forming part of the marine craft 4.

Similarly, both the prior art and a system according to the invention are shown in the present document with reference to a system comprising a single davit, but it is clear that the invention can be applied to a system with multiple arms.

The device shown in FIG. 1, which corresponds to the launching and recovery device most usually used in the state of the art, has several drawbacks. Firstly, the system presented is incompatible with the recovery of a crewless remotely operated or autonomous marine craft 4. Moreover, it does not allow the recovery of the marine craft 4 in a moderate sea. In particular, the lifting cable 7 is difficult to recover, due to the movements of the surface marine craft in a moderate sea. Although the crew of the marine craft 4 may manage to seize the lifting cable 7, attaching it at the lifting point 8 is complex, even hazardous. In particular, the swell causes rapid variations in the level (height) of the surface marine craft 4 with respect to the height of the deck 2 of the carrier ship 1. The invention proposes a system, based on a conventional device with a davit, such as that in FIG. 1, and capable of being adapted to a pre-existing device, allowing the recovery of a surface marine craft in a moderate sea.

Moreover, the invention is described hereinafter on the basis of a lifting device comprising a davit per se. The invention can more generally utilize a lifting means “of the davit type”, i.e. a davit per se or an equivalent lifting device, overhanging the hull of a carrier ship, for example a crane in a similar configuration to that of a davit.

FIG. 2 shows the main elements of a system according to an embodiment of the invention, including an example composition, the use of which is explained with reference to the following figures.

The system in FIG. 2 is thus based on that of the prior art shown in FIG. 1. A lifting device equips a carrier ship 1. The lifting device comprises a davit 5, which is equipped with a lifting cable 7. The davit 5 is here installed on the deck 2 of the carrier ship 1. Moreover, the lifting device comprises a boat hook pole 9 extending laterally from the hull 2 of the carrier ship 1, which can also be called a “pillar jib crane”. The boat hook pole 9 bears, for example at its end, a cable called guide cable 10. The guide cable 10 is thus suspended in space by the boat hook pole 9. An anchor 11 is fastened to the free end of the guide cable 10. The boat hook pole 9 is positioned above the waterline of the carrier ship 1 and preferably above the level of the deck 2 and of the davit 5. The length of the guide cable 10 allows the anchor 11 to be submerged. In other words, when the anchor is freely suspended by the guide cable 11, it is situated below the waterline of the carrier ship 1. Advantageously, the anchor is suspended well below the waterline of the carrier ship 1, so as to remain permanently submerged despite the swell. For example, the anchor can be suspended between two and four metres below the waterline of the carrier ship 1.

The length of the guide cable 10 can be fixed or adjustable. A guide cable 10 of adjustable length, for example using an on-board winch in the carrier ship 1, makes it possible for example to adapt the length of said guide cable 10 to the level of sea swell. The anchor 11 can consist of a massive element, for example made from metal. The anchor 11 can comprise hydrodynamic planes that orient the anchor in a predefined position when the carrier ship 1 moves ahead.

The free end of the lifting cable 7 is fastened detachably to the anchor 11. Moreover, an end portion of said lifting cable 7 is fastened detachably to the guide cable 10, so that, from the anchor 11 to a given point of the guide cable, situated between the anchor 11 and the boat hook pole 9, the lifting cable 7 follows the guide cable 10. On this portion, the lifting cable 7 and the guide cable 10 thus form only a single elongated assembly.

The lifting device also comprises a towing cable 12. The towing cable 12, equivalent to a boat rope used in the known devices, is connected to the carrier ship 1 at a point of the hull 6 situated forward of the davit 5 and forward of the boat hook pole 9.

The concepts of forward and aft are understood, in the whole of the present document, in the usual manner, i.e. along the axis linking the prow of a boat and corresponding to “forward”, to the stern or to the transom of the boat and corresponding to “aft”. The towing cable 12, by its orientation makes it possible, when it is connected to a surface marine craft that must be recovered by the carrier ship 1, to tow the marine craft and to hold it longitudinally in position with respect to the carrier ship 1.

The system in FIG. 2 also comprises a receiving device borne by the marine craft 4.

The receiving device comprises a forward module 13, installed on the bow of the surface marine craft 4. The forward module 13, the composition of which is detailed hereinafter, can be called “rostrum”, as it extends partially overhanging the prow of the marine craft 4.

FIG. 3 shows, in a side view principle diagram, a lifting device utilized in an embodiment of the invention. The elements constituting the lifting device are positioned in FIG. 3 substantially in the position they adopt when the lifting device is installed on a carrier ship. Thus, the lifting device comprises:

- the davit 5, in this case equipped with a winch;
- the lifting cable 7, the length of which varies under the winching effect of the davit 5, the lifting cable being equipped at its free end with a connecting interface 14;
- the boat hook pole 9;
- the guide cable 10, connected to the boat hook pole 9, the length of which is fixed or variable;
- the anchor 11, fastened to the end of the guide cable 10;
- the towing cable 12, the length of which can be altered according to the phases of recovery of the marine craft 4, comprises a free end fastened to the anchor 11.

By “variable length of a cable” is meant that the free part of the cable is variable in length, typically the length of the lifting cable 7 between the davit 5 and its free end, the length of the guide cable between the boat hook pole 9 and the anchor 11, the length of the traction cable 12 between the hull 6 of the carrier ship and the anchor 11.

The lifting device in FIG. 3 is shown in a configuration ready for the recovery of a marine craft. The connection interface 14 in the example here adopts the shape of a hook and is fastened to the anchor 11. The end portion of the lifting cable 7 is fastened to the corresponding end portion of the guide cable 10, by connection means 15. The connection means 15 nevertheless make it possible to release the connection between the lifting cable 7 and the guide cable 10, for example under the effect of a sufficient force.

The guide cable 10 can be equipped with a float or a buoy 16.

FIG. 4 shows a marine craft 4, namely a boat with a semi-rigid hull, which constitutes a preferential application of the invention. The marine craft 4 is equipped with a receiving device, utilized for the recovery of the marine craft 4 by the carrier ship 1. The receiving device comprises a forward module 13 and a lifting support installed on a lifting point 8 of the marine craft 4. The forward module 13 is installed on the prow of the marine craft 4.

A recovery sequence of the marine craft 4, typically corresponding to the marine craft in FIG. 4, by carrier ship will be described with reference to the following figures, the carrier ship and the marine craft being equipped with a recovery system according to an embodiment of the invention.

FIG. 5 thus shows diagrammatically, in a top view, a surface marine craft 4, equipped with a receiving device utilized in the invention, and in particular with a forward module 13. The marine craft 4 must be recovered using a lifting device with a davit 5, so as to be hoisted by its lifting point 8 onto the deck of a carrier ship. The lifting device corresponds more precisely to the lifting device shown in FIG. 3.

In the state shown in FIG. 5, the marine craft 4 is approaching the lifting device.

Once the marine craft 4 has arrived close to the lifting device, as shown in FIG. 6, two bars 17 of the forward module are deployed to form a guide. In particular, the bars 17 are oriented forwards, and form an angle the apex of which is situated at the level of the forward module 13. Thus, the forward module 13 comprises two bars 17 capable of adopting, by pivoting with respect to the rest of the forward module 13, a retracted position shown in FIG. 4, in which they occupy little space and extend slightly outside the marine craft 4 while it is sailing; and the deployed position shown in FIG. 6.

In the retracted position, also called "passive" position, the bars 17 can substantially hug the shape of the (rigid or inflatable) hull of the marine craft 4. In the deployed position, also called "active" position, the bars 17 are oriented substantially in a V-shape with respect to one another, preferably symmetrically with respect to a longitudinal plane of symmetry of the marine craft (if the marine craft is symmetrical). The bars 17 extend overhanging the bow of the marine craft 4 substantially horizontally (parallel to the surface of the water), and form an angle between them in order to allow the recovery and guiding towards the forward module 13 of any substantially vertical cable or element entering between them.

Of course, other configurations of the forward module can be used, according to various variant embodiments of the invention, so as to form a convergent guide, in particular with fixed or mobile bars, in planes other than the horizontal plane. The bars 17 can be incurved (for example to hug the shape of the forward hull of the marine craft). The means allowing a cable or rope to be received at the level of the prow of the marine craft can have shapes other than two bars; it can be in one piece or otherwise be formed from several elements capable of unfolding to form a guide. The movement of the bars 17, or of any other means allowing a cable to receive at the bow of the marine craft, can be automatic (motorized) or manual.

In the example shown, the marine craft 4 is then manoeuvred to bring the guide cable 10 facing the branches 17, within the angle that they form.

FIG. 7 represents the forward module 13, with its bars 17 deployed, during the approach of the guide cable 10. The guide cable 10 is shown in three successive positions, referenced a, b, and c. At the level of the section of the guide cable 10 shown in FIG. 7, the guide cable is connected to the lifting cable 7.

In position a, the guide bars 17 come into abutment against the guide cable 10 and the lifting cable 7, due to the forward movement of the marine craft 4. By converging towards the forward module 13, the bars 17 guide the guide cable 10 and the lifting cable 7 towards a trigger 18, on which the guide cable 10 and the lifting cable 7 press so as to actuate it in rotation (position b in FIG. 7).

Figure 8:
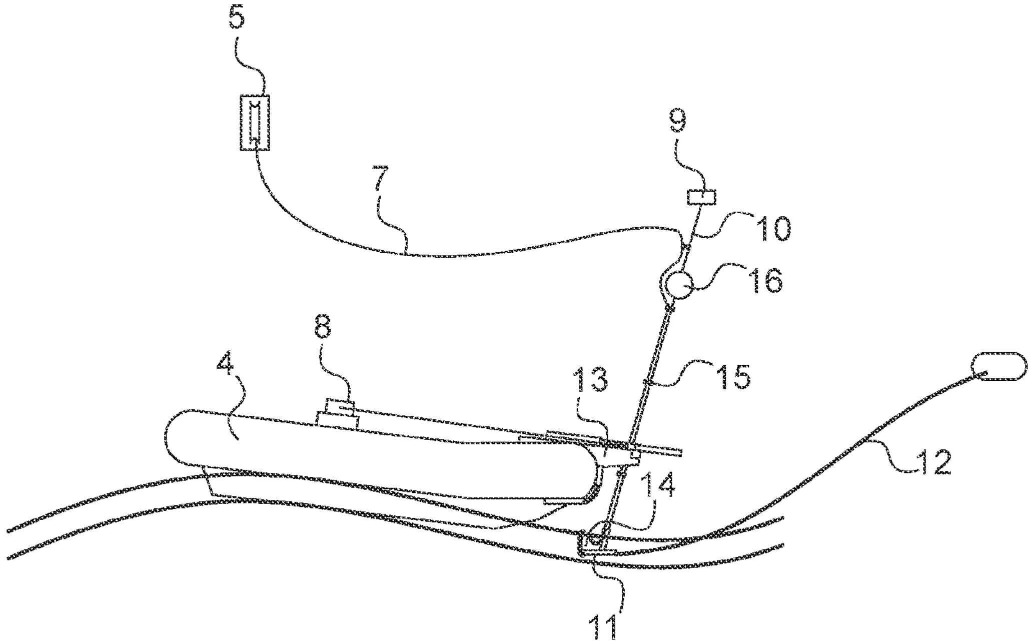
FIG. 8 shows, in a diagrammatic side view, a step of recovery of the surface marine craft in FIGS. 5 and 6 by a lifting device in FIGS. 3, 5 and 6.

The guide cable 10 and the lifting cable 7 then enter an opening 19 formed in the forward module 13. Once the trigger 18 is free from the guide cable 10 and the lifting cable 7, it closes again so as to prevent the guide cable 10 and the lifting cable 7 from coming out of the opening 19. The guide cable 10 and the lifting cable 7 can nevertheless move freely in vertical translation in the opening 19. This position corresponds to the position c shown in FIG. 7, and also corresponds to the step shown in FIG. 8, in a side view similar to the view in FIG. 3. Thus, the marine craft 4 is connected by its forward module 13 to the guide cable 10 and concomitantly to the lifting cable 7, which can nevertheless translate in the forward module 13, under the effect of a movement of the marine craft relatively to the carrier boat; said movement being capable of corresponding to a movement in the horizontal plane (ahead or astern movement of the marine craft, lateral movement) or vertically (movement caused by the waves, the swell).

At this stage, the traction cable is loose, and applies no significant force on the marine craft 4.

Figure 9:
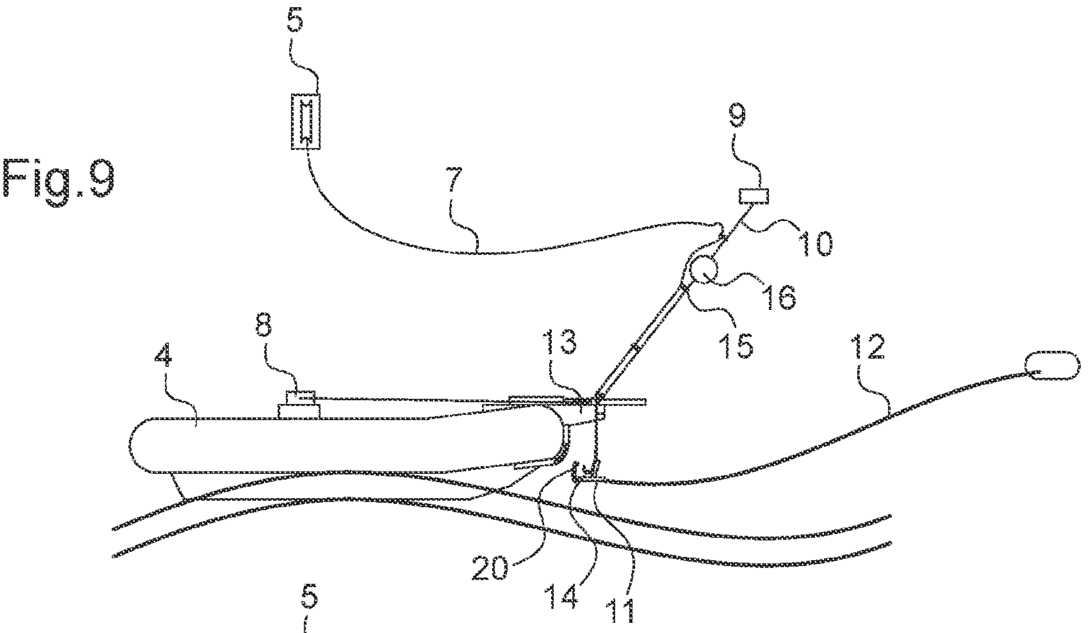
FIG. 9 shows a recovery step following the step in FIG. 8.

In the step shown in FIG. 9, the marine craft 4 has moved astern with respect to the boat hook pole 9, which has the effect of lifting the guide cable 10 into the forward module 13, The anchor 11 thus leaves the water, and starts to approach the underside of the forward module 13.

Astern movement of the marine craft can be achieved by decreasing speed, to a speed lower than that of the carrier boat, for example.

The system shown here comprises a guide cable of fixed length. As an alternative or in addition, the guide cable can be of variable length, for example adjustable with the use of a winch, to cause the guide cable to be raised into the opening 19 of the forward module 13.

Figure 10:
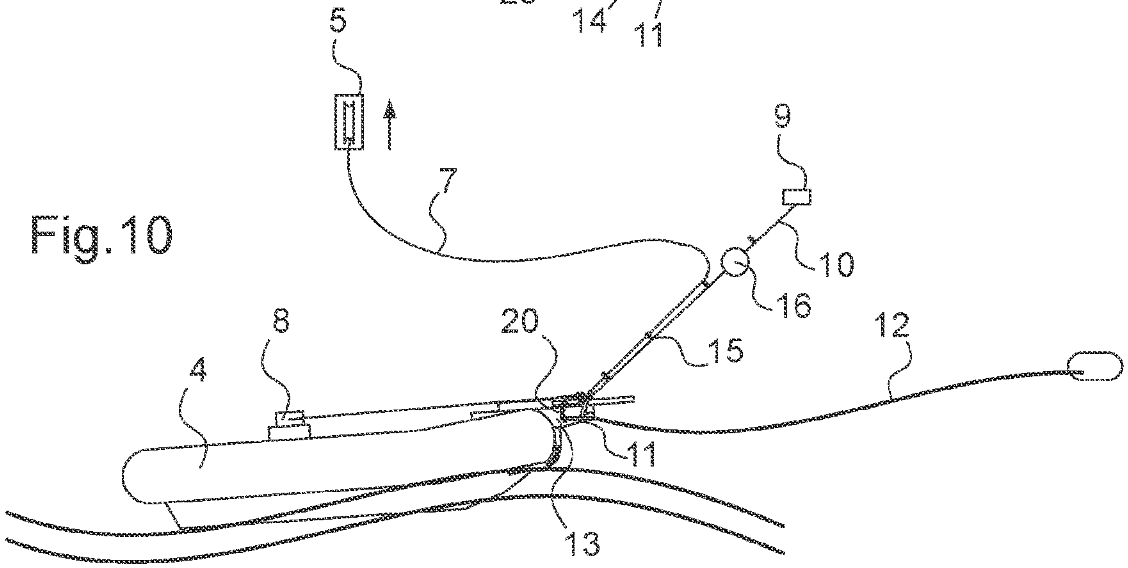
FIG. 10 shows a recovery step following the step in FIG. 9.

In the step shown in FIG. 10, the anchor 11 has come into contact with the forward module 13. The anchor 11 is nested in the forward module 13. More precisely, an arm 20 of the anchor 11 has lodged in a corresponding receiving housing of the forward module 13. The arm 20 of the anchor is a part of the anchor preferably oriented substantially vertically, so that it is introduced into the housing of the forward module 13 via an opening arranged under said forward module 13. Once in the receiving housing, the arm 20 and consequently the anchor 11 are immobilized with respect to the forward module 13.

The part of the anchor 11 to which the connecting interface 14 of the lifting cable is connected, which here has the shape of a hook, is introduced into the opening 19 of the forward module 13. This positions the hook facing a handle 21, shown in FIG. 7.

The connecting interface is then engaged on said handle 21, and hooks onto the latter.

Of course, any other connection interface configuration can be envisaged, provided that said connection interface is configured so as to connect to the handle 21 during fastening of the anchor 11 to the forward module 13.

The winch of the davit 5 is actuated, which reduces the length of the lifting cable 7. The shortening of the lifting cable 7 starts to cause its separation from the guide cable 10, as shown in FIG. 10 where the connection means situated above the buoy 16 has yielded, to release the lifting cable 7.

The connection means 15 progressively release the lifting cable 7 until it is completely separated from the guide cable 10.

The handle 21 is furthermore connected by a cable to a winch situated close to the lifting point 8 of the marine craft 4.

Traction of the lifting cable 7 on the handle 21 and/or the actuation of the winch situated close to the lifting point 8 releases the handle 21 of the forward module 13.

Figure 11:
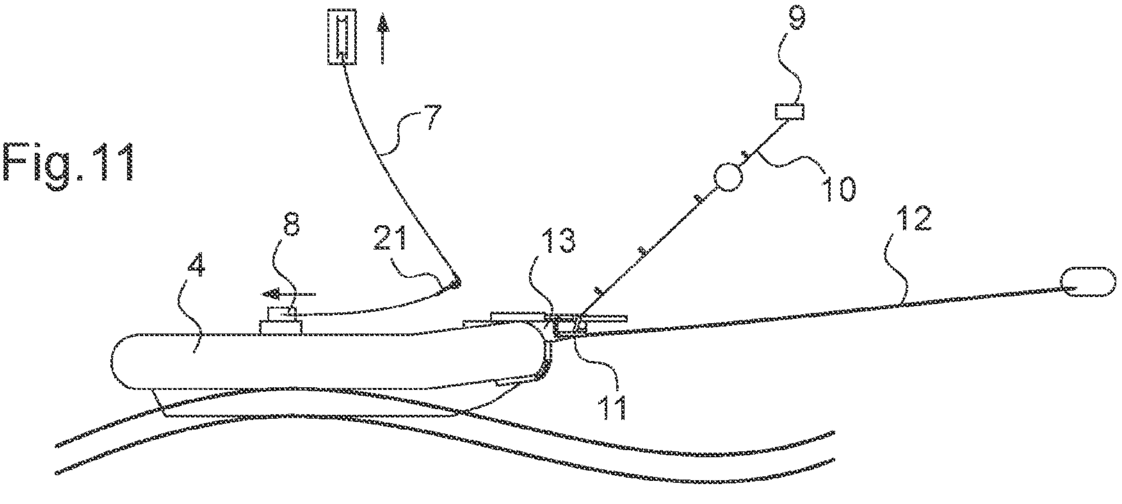
FIG. 11 shows a recovery step following the step in FIG. 10.

Take-up of the cable connecting the handle to the winch situated close to the lifting point 8 brings said handle 21 towards the lifting point 8. This step is shown in FIG. 11.

In this situation, the towing cable 12 ensures that the marine craft is held longitudinally with respect to the carrier boat. The guide cable 10 essentially ensures that it is held laterally, at its prow level.

When the handle reaches the lifting point 8, it is fastened to a lifting support that is arranged at this point, automatically (for example as explained with reference to FIGS. 19 to 21) or manually.

The marine craft 4 can then be lifted, hoisted out of the water by the lifting cable 7. More precisely, the connection interface 14 (for example in the form of a hook) of the lifting cable is engaged with the handle 21 which is fastened to the lifting support. This step is shown in FIG. 12. FIG. 13 shows this same step, in a three-dimensional view similar to that in FIGS. 1 and 2, on which the carrier ship 1, its deck 2, and the davit 5 in particular are clearly visible.

FIGS. 14 to 18 show in detailed principle views the sequence that takes place at the forward module 13 during the recovery of the marine craft.

Figure 14:
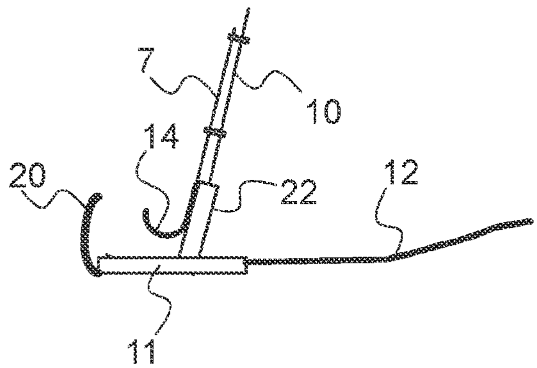
FIG. 14 shows, in a diagrammatic side view, an anchor utilized in an embodiment of the invention.

FIG. 14 shows the anchor 11, which comprises an arm 20. It comprises a vertical extension 22 to which the guide cable 10 is connected. The connection interface 14 situated at the end of the lifting cable 7 is fastened detachably to the vertical extension 22. Finally, the towing cable 12 is also connected to the anchor 11.

Figure 15:
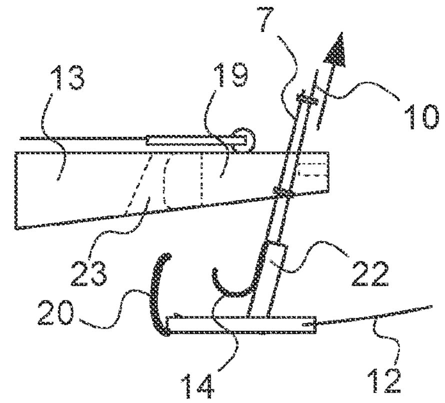
FIG. 15 shows, in a view similar to that in FIG. 14, a step of the engagement between the anchor in FIG. 14 and a forward module utilized in this embodiment of the invention.

In FIG. 15, the guide cable 10 and the lifting cable 7 have been inserted into the opening 19 of the forward module 13 of a marine craft that must be recovered, and are held therein (for example under the effect of a trigger situated at the entry to the opening 19). The anchor 11 is brought towards the forward module 13, under the traction effect of the guide cable 10 (which is shortened), or due to a movement of the marine craft.

Figure 16:
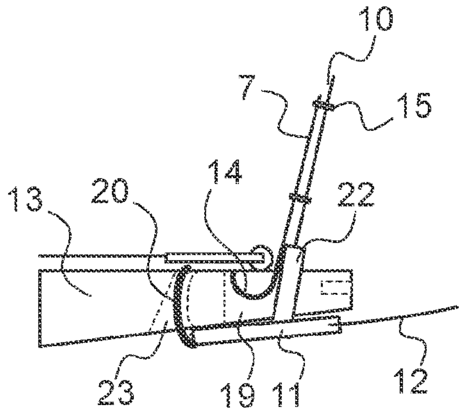
FIG. 16 shows a step of the engagement between the anchor and the forward module following the step in FIG. 15.

In FIG. 16, the arm 20 is inserted into a receiving housing 23. The receiving housing 23 is shaped to accommodate the arm 21. A mechanism, situated in the housing 23, or on the arm 20 (or both) makes it possible to immobilize the arm 20 in the housing 23. The anchor 11 is thus fastened rigidly to the forward module 13. This also has the consequence of positioning the connection interface 14, in this case a hook, facing the handle 21 to which it is ready to attach. Thus, the cooperation between the arm 20 and the anchor makes it possible to position the anchor accurately with respect to the forward module 13, so as to position the hook correctly so that the handle 21 engages therein. Moreover, once the arm 20 is engaged, fastening with the forward module is final, i.e. the anchor can no longer be released from the forward module without intentional human intervention.

Figure 17:
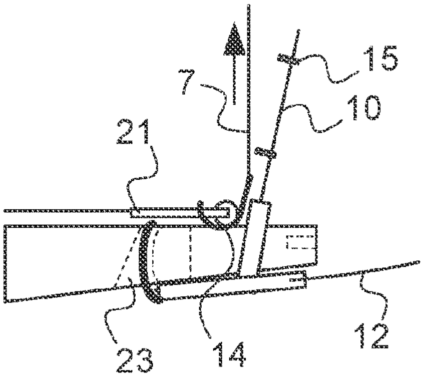
FIG. 17 shows a step of the engagement between the anchor and the forward module following the step in FIG. 16.

In FIG. 17, traction exerted on the lifting cable 7 has the consequence of separating said lifting cable 7, the end portion of which was connected to the guide cable 10, from said guide cable, and engaging the handle 21 in the hook.

Figure 18:
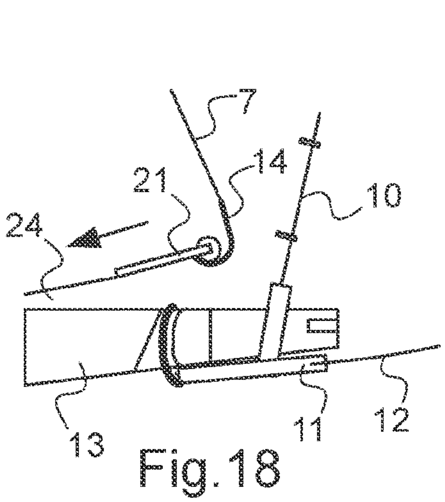
FIG. 18 shows a step of the engagement between the anchor and the forward module following the step in FIG. 17.

In FIG. 18, the handle 21 has been separated from the forward module 13. It is brought in the direction of the lifting point of the marine craft, by traction on a handle cable 24, to be fastened thereon.

Figure 19:
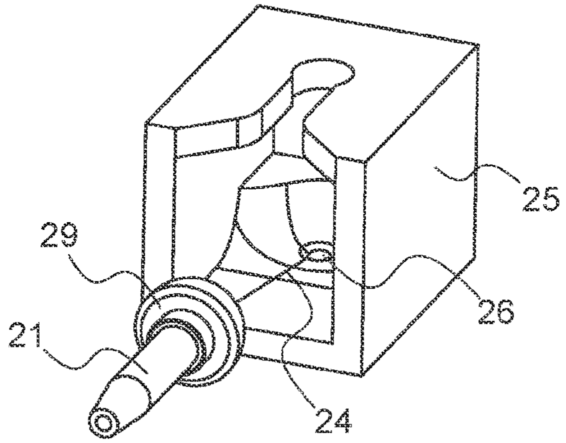
FIG. 19 shows, in a diagrammatic three-dimensional view, an example of the structure of a handle and a lifting support utilized in an embodiment of the invention.
Figure 20:
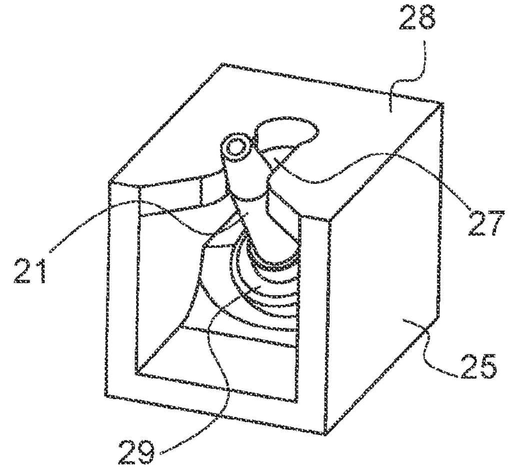
FIG. 20 shows, in a view similar to that in FIG. 19, the handle and the lifting support in an intermediate position.
Figure 21:
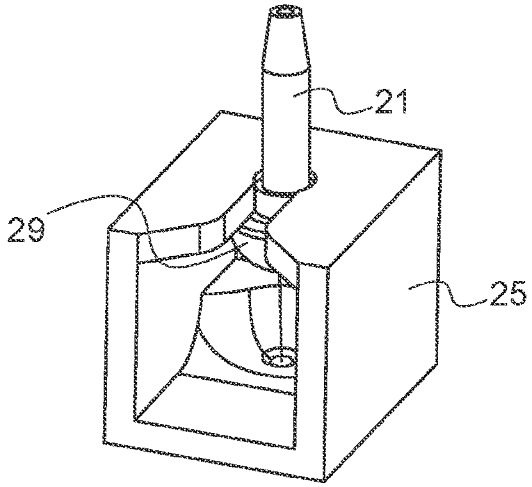
FIG. 21 shows, in a view similar to that in FIGS. 19 and 20, the engagement between the handle and the lifting support.

As shown in FIG. 19, a casing 25 can be installed at the lifting point of the marine craft, so as to form a lifting support. The casing 25 comprises an open face, and a lower aperture 26 through which the cable of handle 24 passes. The traction exerted by the cable of handle 24 on the handle 21 brings the handle 21 into the casing 25, in which it is inserted via the open face. The lifting cable, not shown in FIGS. 19 to 21, begins to exert a vertical traction on the handle 21, which causes it to be raised in the casing 25, shown in FIG. 20. A notch 27 produced in the upper face 28 of the casing 25 makes it possible for an upper element of the handle 21 (to which the lifting cable is connected via its end hook or other connection interface) to pass through. After the handle 21 has been fully raised, a base 29 of the handle is locked in the casing 25. The marine craft can then be lifted by the lifting cable. The device allowing automatic fastening of the handle to the lifting point that is shown in FIGS. 19 to 21 is of course only one possible embodiment example. Other configurations can be envisaged, as well as a system requiring manual attachment of the handle.

The system thus developed in the invention allows the recovery of a surface marine craft from a carrier boat. It can be used both for piloted marine craft and for crewless remotely operated or autonomous marine craft. Moreover, recovery of the marine craft can be carried out in a moderate sea, typically up to a sea state of level 4 or 5 according to the Douglas scale. The invention is based on a lifting means of the conventional davit type, which limits its cost, facilitates its utilization, and makes it possible to adapt the system to a pre-existing davit.

The invention claimed is:

1. A recovery system for recovery of a surface marine craft by a carrier ship, said recovery system comprising:
- a lifting device configured to equip the carrier ship, the lifting device comprising:
  - a davit lift equipped with a lifting cable comprising a connection interface at one end thereof,
  - a boat hook pole configured to extend laterally outside a hull of the carrier ship, above the waterline of the carrier ship, a guide cable being suspended from said boat hook pole,
  - an anchor connected to a free end of said guide cable, said guide cable being dimensioned so that, when the anchor is suspended from the boat hook pole by the guide cable, in an absence of other constraints, the anchor is below the waterline of the carrier ship, the connection interface of the lifting cable being detachably connected to the anchor, and
  - a towing cable connected to the anchor and configured to be connected to the carrier ship forward of the boat hook pole; and
- a receiving device configured to cooperate with the lifting device and configured to equip the surface marine craft, the receiving device comprising:
  - a forward module configured to equip a prow of the surface marine craft, the forward module comprising an opening configured to jointly receive the guide cable and the lifting cable and to allow said guide cable and lifting cable freedom in translation in said opening, and a receiving housing configured to receive a part of the anchor by which the anchor fastens to said forward module when said part is engaged in said housing, fastening of the anchor to the forward module leading to fastening of the connection interface of the lifting cable to a handle detachably connected to the forward module, and a lifting support configured to be rigidly fastened at at least one lifting point of the marine craft, said lifting support being shaped to receive and immobilize the handle.

2. The recovery system according to claim 1, wherein the lifting cable comprises an end portion detachably fastened to the guide cable to facilitate jointly receiving said guide cable and lifting cable in the opening of the forward module.

3. The recovery system according to claim 1, further comprising a winch on which the towing cable is wound to vary the length of the towing cable outside the hull of the carrier ship.

4. The recovery system according to claim 1, wherein the anchor comprises an arm, the anchor being fastened to the forward module at least partially using the arm, said arm being substantially oriented towards the surface of the water when the anchor is suspended by the guide cable, in an absence of other constraints, and submerged.

5. The recovery system according to claim 1, wherein the receiving device further comprises two guide bars articulated on the forward module, said bars being configured to pivot from a folded position to a deployed position in which the bars form a guide, converging towards said forward module.

6. The recovery system according to claim 1, wherein the handle and the lifting support have corresponding shapes, such that the handle is immobilized with respect to the lifting support when the lifting cable, which is fastened to the handle via the connection interface, is tensioned.

7. The recovery system according to claim 1, further comprising a tension roller disposed close to the lifting support, the tension roller comprising a handling cable connected to the handle, take-up of the handling cable enabling bringing the handle from the forward module to the lifting support.

8. A marine system comprising:

a surface marine craft comprising the recovery system according to claim 1; and a carrier ship, wherein the lifting device equips the carrier ship and the receiving device equips the marine craft.

9. The marine system according to claim 8, wherein the marine craft is a small craft of the semi-rigid hull type.

10. A method for the recovery of a marine craft equipped with a receiving device configured to be received by a carrier ship equipped with a lifting device, said receiving device and the lifting device forming the recovery system according to claim 1, said method comprising:

launching the anchor connected to the guide cable and to the traction cable, the connection interface of the lifting cable being connected to said anchor;

receiving, in the opening of the receiving device, the guide cable and the lifting cable;

bringing the anchor against the forward module and engaging, in the housing of the forward module, the part of the anchor configured to be received in the housing, leading to fastening of the anchor to the forward module and fastening of the connecting interface of the lifting cable to the handle;

separating the handle with respect to the anchor, the marine craft remaining guided by the guide cable and towed by the towing cable;

fastening the handle to the lifting support;

lifting the marine craft by the lifting cable; and placing the marine craft on a deck of the carrier ship using the davit lift.

11. The recovery system according to claim 2, further comprising a winch on which the towing cable is wound to vary the length of the towing cable outside the hull of the carrier ship.

12. The recovery system according to claim 2, wherein the anchor comprises an arm, the anchor being fastened to the forward module at least partially using the arm, said arm being substantially oriented towards the surface of the water when the anchor is suspended by the guide cable, in an absence of other constraints, and submerged.

13. The recovery system according to claim 3, wherein the anchor comprises an arm, the anchor being fastened to the forward module at least partially using the arm, said arm being substantially oriented towards the surface of the water when the anchor is suspended by the guide cable, in an absence of other constraints, and submerged.

14. The recovery system according to claim 2, wherein the receiving device further comprises two guide bars articulated on the forward module, said bars being configured to pivot from a folded position to a deployed position in which the bars form a guide, converging towards said forward module.

15. The recovery system according to claim 3, wherein the receiving device further comprises two guide bars articulated on the forward module, said bars being configured to pivot from a folded position to a deployed position in which the bars form a guide, converging towards said forward module.

16. The recovery system according to claim 4, wherein the receiving device further comprises two guide bars articulated on the forward module, said bars being configured to pivot from a folded position to a deployed position in which the bars form a guide, converging towards said forward module.

17. The recovery system according to claim 2, wherein the handle and the lifting support have corresponding shapes, such that the handle is immobilized with respect to the lifting support when the lifting cable, which is fastened to the handle via the connection interface, is tensioned.

18. The recovery system according to claim 3, wherein the handle and the lifting support have corresponding shapes, such that the handle is immobilized with respect to the lifting support when the lifting cable, which is fastened to the handle via the connection interface, is tensioned.

19. The recovery system according to claim 4, wherein the handle and the lifting support have corresponding shapes, such that the handle is immobilized with respect to the lifting support when the lifting cable, which is fastened to the handle via the connection interface, is tensioned.

20. The recovery system according to claim 5, wherein the handle and the lifting support have corresponding shapes, such that the handle is immobilized with respect to the lifting support when the lifting cable, which is fastened to the handle via the connection interface, is tensioned.

* * * * *